Sept. 4, 1956 R. E. HOULE 2,761,283
RESONANT TYPE JET PROPULSION ENGINES
Filed July 23, 1951 8 Sheets-Sheet 1

INVENTOR.
ROBERT E. HOULE
BY
ATTORNEY

Sept. 4, 1956　　　　R. E. HOULE　　　　2,761,283
RESONANT TYPE JET PROPULSION ENGINES
Filed July 23, 1951.　　　　　　　　　　　　8 Sheets-Sheet 2

INVENTOR
ROBERT E. HOULE
BY
ATTORNEY

Sept. 4, 1956 R. E. HOULE 2,761,283
RESONANT TYPE JET PROPULSION ENGINES
Filed July 23, 1951 8 Sheets-Sheet 5

INVENTOR
ROBERT E. HOULE
BY
ATTORNEY

INVENTOR.
ROBERT E. HOULE
ATTORNEY

Sept. 4, 1956
R. E. HOULE
2,761,283
RESONANT TYPE JET PROPULSION ENGINES
Filed July 23, 1951
8 Sheets-Sheet 7

INVENTOR.
ROBERT E. HOULE
BY
ATTORNEY

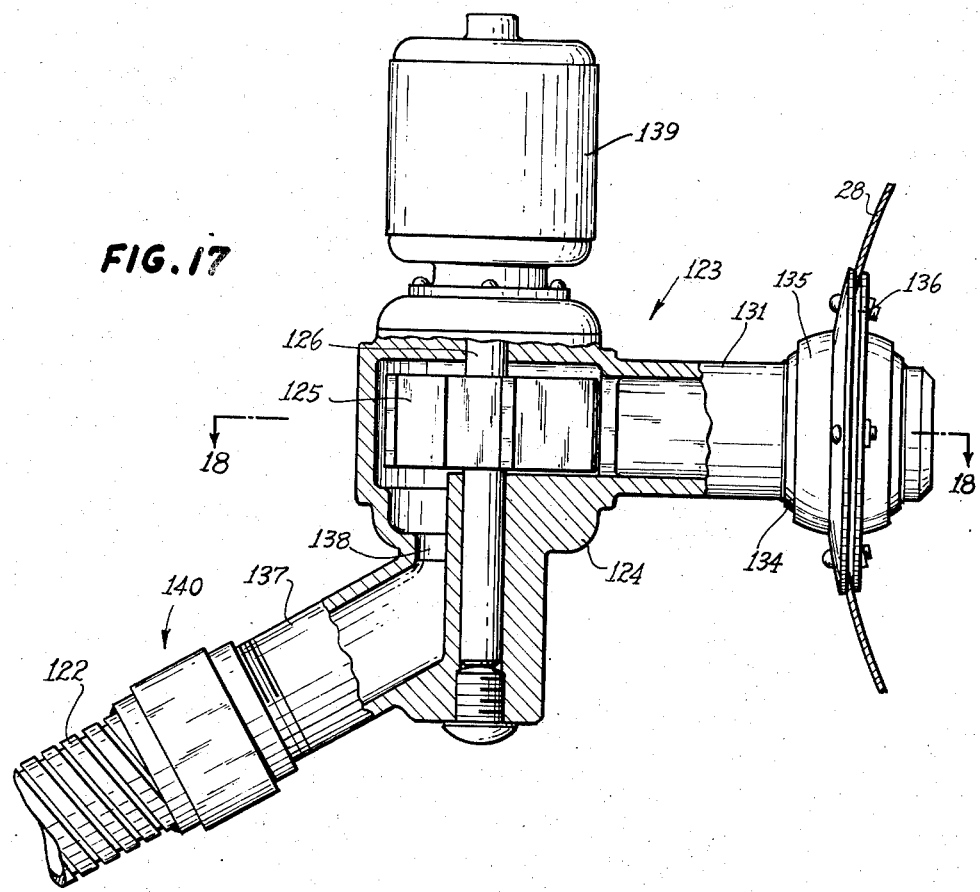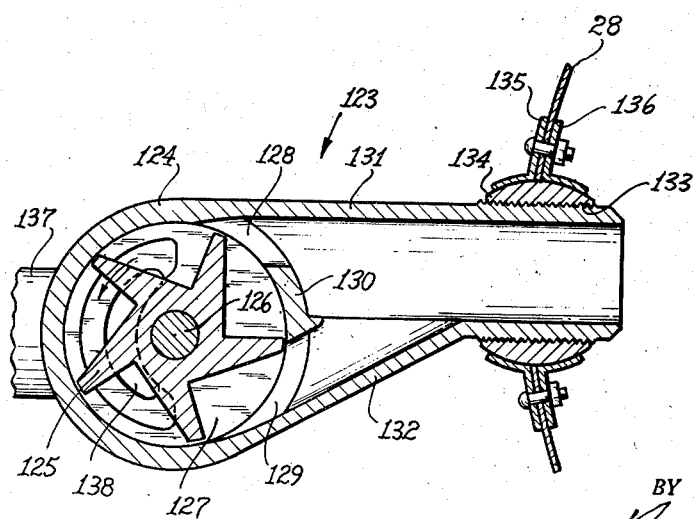

United States Patent Office 2,761,283
Patented Sept. 4, 1956

2,761,283
RESONANT TYPE JET PROPULSION ENGINES
Robert E. Houle, Willimantic, Conn.
Application July 23, 1951, Serial No. 238,173
13 Claims. (Cl. 60—39.27)

The present invention relates to jet propulsion engines, and is particularly directed to improved resonant type jet propulsion engines in which wave matching or phase control is achieved. This application is a continuation in part of my co-pending applications Serial No. 32,064, filed June 10, 1948, and Serial No. 129,110, filed November 23, 1949, both abandoned in view of the filing of this application.

It is known that the utilizable power output of existing jet propulsion engines, whether ram jets, turbine jets, internal reaction rocket motors or resonant jets, is never more than a relatively small fraction, often not more than 20 to 25%, of the calculated theoretical output thereof. The calculated theoretical output is determined as the difference between the energy that may be released in the complete molecular reaction of the combustible mixture involved and the sum of the energy necessary to initiate the molecular reaction and the heat of formation of the combustion and its products.

It is apparent that a substantial improvement in the efficiency of jet propulsion engines, particularly in the field of air travel, would not only be desirable for reasons of economy but would also materially increase the range and ceiling of conventional aircraft.

The great disparity heretofore existing between the energy actually obtained from a given quantity of the combustible mixture and the energy that one would expect to be made available by a complete molecular reaction is explainable by the fact that, what has been assumed to be a homogeneous combustion process, is in reality, in the chemical gas phase, only an incomplete reaction. During this incomplete reaction, the fuel molecules have random wave lengths and only a very small number of the fuel molecules in the combustible mixture are sufficiently excited and ionized to cause critical concentrations of dissociated atoms and radical forming new combinations and leading to heterogeneous reactions in the gas phase which are of a superior type or order of reaction and effect the liberation of molecular energy. When only a relatively few of the fuel molecules are sufficiently excited, the slower moving molecules, that is, those of greater wave lengths, have a tendency to damp out the effects of collisions between the sufficiently excited molecules, and reactions of the superior order or type, effecting the release of molecular energy, are thus discouraged.

Therefore, it is an object of the present invention to provide a resonant jet engine, effecting a combustion reaction in the fuel gases of a high order or type releasing molecular energy so that the actual power output of the engine closely approaches the theoretical calculated power output therefor.

The excitation or activation of the fuel molecules in a combustible mixture may be achieved by a combination of pressure and temperature. It can be shown that for a given combustible mixture, there exist certain critical conditions which, upon their occurrence change a relatively slow combustion into a violent detonation. Thus, if pressure versus temperature is plotted, a curve is obtained marking the boundary between the slow combustion and the violent detonation. As long as the pressure is relatively low, for example, of the order of one atmosphere or less, detonation will only occur at elevated temperatures which may be of the order of from 500° to 1000° C. For higher pressures, the critical temperatures are reduced and, if a uniformly low temperature is maintained while the pressure is varied, the initiation of detonations will coincide with the occurrence of the high pressure peaks.

The mode of operation of any resonant jet engine is well understood insofar as it involves the transmission of a series of pulses or explosions along a tube, with the direct and reflected pulses meeting and coalescing to divide the tube into a series of vibrating parts, called "ventral segments," each separated from the other by a point of apparent rest, called a "node." Each nodal point will be an area in which variable pressures will be generated, and if the variable pressures are sufficient, at or near the peak values, they may effect detonation of the combustible mixture introduced to the jet tube. It is the production of shock waves within the jet tube of frequency and magnitude effecting dissociation of molecules to provide dissociated atoms and radical of the fuel which distinguishes the mode of operation of resonant jet engines embodying the present invention from those heretofore known.

Accordingly, a further object of the present invention is to provide a resonant jet engine and method of operating the same which effects the detonation of the combustible mixture primarily through the use of shock pressures in a manner to form dissociated atoms and radical by a reaction liberating molecular energy.

It has been found that any flame, having velocity, is scattered by the individual electrons acting at random and setting up ionization at the flame front. This scattering is enhanced or increased when the flame is subjected to an acoustic wave harmonically related to the natural frequency of the fuel molecules, having a shielding minimum wavelength of approximately one Debye length, so that the two frequencies are superposed to produce a resultant frequency of greater amplitude which beats against the flame front to extend the latter and thus increase the area over which ionization is set up. From this observation, it has been deduced that the proportion of fuel molecules which are critically excited and ionized may be increased when the flame front is extended by subjecting the flame to an acoustic wave harmonically related to the natural frequency of the fuel molecules.

Still another object of the present invention resides in the provision of a resonant jet engine in which the flame front is extended and scattering of the flame increased by subjecting the latter to an acoustic wave having a frequency harmonically related to the natural frequency of the fuel molecules.

I have found that the above, and other objects, features and advantages apparent in the following description, may be accomplished by providing a resonant jet engine, or other similar power plant, having an elongated discharge tube or combustion chamber, with means for rhythmically phasing the inflow of a combustible mixture to the combustion chamber at a frequency which is harmonically related to both the acoustic resonant frequency, or fundamental frequency, of the tube at operating conditions and the natural frequency of the fuel molecules during detonation, and in a manner to produce shock waves in the tube of amplitudes greater than approximately 140 decibels.

The invention may be realized in a number of different ways, some of which are illustrated in the accompanying drawings forming a part hereof, and are described in detail by way of example:

In the drawings:

Fig. 17 is a side elevational view of a combustible mixture injector assembly included in the engine of Fig. 15, and shown on a greatly enlarged scale;

Fig. 18 is a sectional view of the combustible mixture injector taken along the line 18—18 of Fig. 17.

Figure 2:
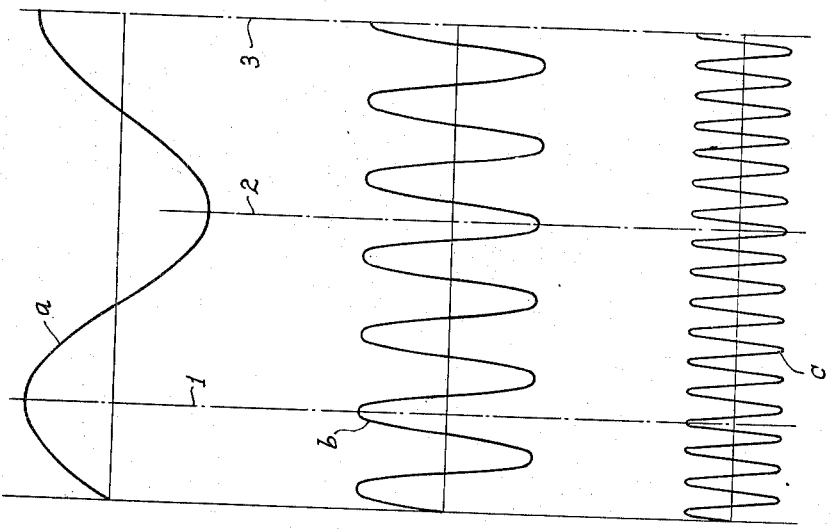
Fig. 2 is a diagram, similar to that shown in Fig. 1, but illustrating the several wave formations in a resonant jet engine constructed and operated according to another embodiment of the present invention.

The present invention contemplates the provision of resonant jet engines which are constructed and operated in a manner to accomplish the substantial release of molecular energy during a combustion process of a high order. As previously pointed out, the combustion process in existing engines of the described process appears to be incomplete in that only a relatively small proportion of the fuel molecules are sufficiently excited and ionized to effect the release of molecular energy. I have found that the presence of standing shock waves in the tube of a resonant jet engine, if suitable frequency and amplitude, acting upon the combustible mixture has the effect of promoting the rigorous dissociation of molecules which, as a result of having been subjected to heat and pressure, have been activated to a certain degree but not sufficiently to result in the separation and recombination of their atoms or radical so as to liberate molecular energy. Thus, the shock waves provide the impetus for urging the insufficiently activated or excited molecules to reach the critical state of activation at which the liberation of molecular energy occurs by reason of the recombination of dissociated atoms or radical.

The problem to which I have directed my attention concerns the production of such standing shock waves of sufficient amplitude and suitable frequency in the tube of a resonant jet engine. It has been found that such standing shock waves may be obtained only by what I call "wave matching" or "phase control," that is, the rhythmic introduction of the combustible mixture into the combustion chamber at a frequency selected so that the several sources of wave propagation within the jet tube all reinforce each other to produce the required shock wave of great amplitude.

In order to better understand the various factors at work within the jet tube, it is necessary to refer to certain previously known and newly discovered phenomenon. It is well known that an elongated tube, closed at one end, will be resonant to sound waves having a wavelength two times the length of the tube, the frequency of such sound waves being the "fundamental frequency" of the tube. Such a tube will also be resonant to all odd harmonics of the fundamental frequency. It should be noted that the fundamental frequency of any tube of the described character will vary for different media of propagation within the tube and for different temperatures as the speed of propagation of the sound waves depends on these factors. Thus, the phrase "fundamental frequency of the tube at operating conditions," when used hereinafter, will refer to the fundamental frequency existing at the operating temperature and with the combustible mixture, rather than air, in the tube. When a tube of the described character resonates in response to an exciting acoustic wave having a frequency which is harmonically related to the fundamental frequency of the tube, the effect is to produce a resultant acoustic wave of increased amplitude, and, if the inducing acoustic wave has sufficient energy, the resultant acoustic wave may have a frequency which is a higher harmonic of the fundamental frequency of the tube.

Previous efforts to utilize the above characteristic of a tube closed at one end in a resonant jet engine have merely controlled the interrupted admission of the combustible mixture so that the frequency of the interrupted admission is harmonically related to the fundamental frequency of the tube. However, another source of wave propagation is present in the tube of a resonant jet engine and it is the failure to consider this other source of propagation in the devices heretofore proposed that has resulted in the absence therein of the shock wave phenomenon which distinguishes the present invention. When a combustible mixture burns, the fuel molecules at the flame front have a well established "natural frequency" and produce "scattering" of the flame. If the flame is introduced into an elongated tube having a fundamental frequency harmonically related to the natural frequency of the fuel molecules, the acoustic wave put off by the flame, having a wavelength of approximately one Debye length, will be raised to a roar and will distort and extend the flame front. In a resonant jet engine this coaction between the natural frequency of the fuel molecules and the fundamental frequency of the tube may have multiple advantages. First, the extension of the flame front places a greater proportion of the fuel molecules in a position to be excited and ionized and to give off the acoustic wave characteristic of the fuel molecules, so that the acoustic wave given off at the flame front is thereby in turn strengthened, and the proportion of the fuel molecules which are sufficiently excited and ionized at the flame front to produce dissociated atoms or radical recombining in a reaction liberating molecular energy is similarly increased. Secondly, if the frequency at which the combustible mixture is introduced into the combustion chamber is controlled so that it is harmonically related to the "natural frequency" of the fuel molecules as well as to the "fundamental frequency" of the jet tube, it is apparent, from the principle of the superpositioning of tones, that the acoustic waves, resulting from the interrupted admission of the combustible mixture, and the acoustic waves given off at the flame front will reinforce each other and will be in turn reinforced by the resonating tube to generate standing shock waves having nodal points of variable pressure which may be sufficient at, or near, the peak pressure to produce the desired violent detonation of the fuel and the activation of the slower moving fuel molecules necessary for the liberation of molecular energy.

It has been found that the formation of disassociated atoms or radical which then recombine in a reaction liberating molecular energy is only accomplished when the shock wave has an amplitude of approximately 140 decibels or greater. This excitation of the fuel molecules by shock waves and the resultant manifestations of liberation of molecular energy has been called "shock fission," and I have found that the generation of waves having amplitudes substantially less than 140 decibels will not effect the desired increase in the out-put efficiency.

Figure 1:
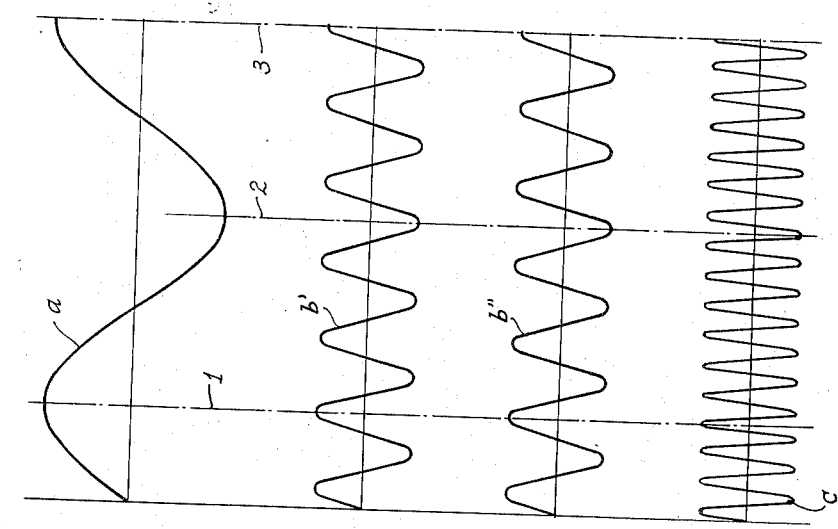
Fig. 1 is a diagram illustrating the various wave formations in a resonant jet engine constructed and operated according to one embodiment of the present invention.

Referring particularly to Fig. 1 of the accompanying drawings, I have diagrammatically illustrated the several acoustic waves generated in the jet tube of a resonant jet engine embodying the present invention. The line $a$ represents the fundamental frequency of the tube in question, while the lines $b$ and $c$ respectively represent the acoustic waves generated by the interrupted or phased admission of the combustible mixture and by the natural frequency of the excited fuel molecules at the flame front. Since waves $b$ and $c$ are odd harmonics, being the 5th and 13th harmonics, respectively, of wave $a$, peaks of waves $b$ and $c$ will occur at or near the peaks of the wave $a$, as at lines 1, 2 and 3. In accordance with the principle of superposition, the resultant wave will have an amplitude equal to the sums of the amplitudes of waves $b$ and $c$ further increased by the sympathetic resonance of the tube. When a single inflow of the combustible mixture is provided, as represented by the line $b$ in Fig. 1, the necessary amplitude of 140 decibels for the shock wave must be achieved by the increasing amplitude of the wave $b$ so that its distorting effect on the flame front, which increases the amplitude of the wave $c$, combines with the greater amplitude of wave $b$ to provide the required shock wave.

However, the great amplitude of the resultant standing shock waves is preferably obtained by providing a plurality of phased inlets for the combustible mixture. Then each inlet generates an acoustic wave, and the corresponding peaks of these last mentioned waves are reinforcing and produce the necessary amplitude. This arrangement is diagrammatically illustrated in Fig. 2 wherein line $a$ and line $c$ once again represent the harmonically related fundamental frequency of the tube and natural frequency of the fuel molecules, respectively, and wherein the lines $b'$ and $b''$ represent the waves generated by two phased inlets for the combustible mixture. While the diagram in Fig. 2 shows the waves generated by only two inlets, it is to be understood that many more such inlets may be provided, as will be hereinafter specifically illustrated, so that the reinforcing effect will be greatly multiplied.

Figure 3:
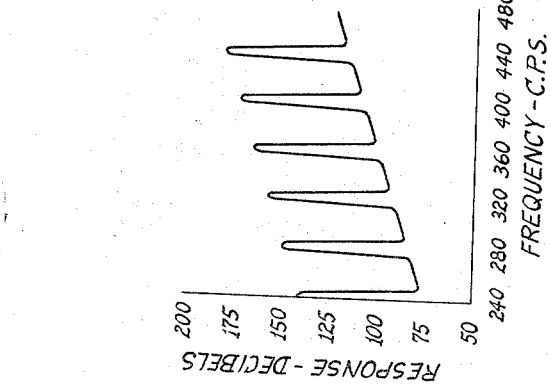
Fig. 3 is a graphic representation of the relationship between the phasing of the inflowing combustible mixture and the response in a resonant jet engine constructed and operated according to the present invention.

In Fig. 3, the relationship between the frequency of the phased input of combustible mixture and the amplitude of the resultant wave generated in the jet tube is graphically illustrated. Plotting the frequency of input as the abscissa and the response or amplitude of the generated wave as the ordinate, it can be seen that peaks of 140 decibels or higher are obtained at regularly spaced frequencies of input which correspond to the various harmonics of the fundamental frequency of the jet tube phasing with the natural frequency of the fuel molecules.

Figure 4:
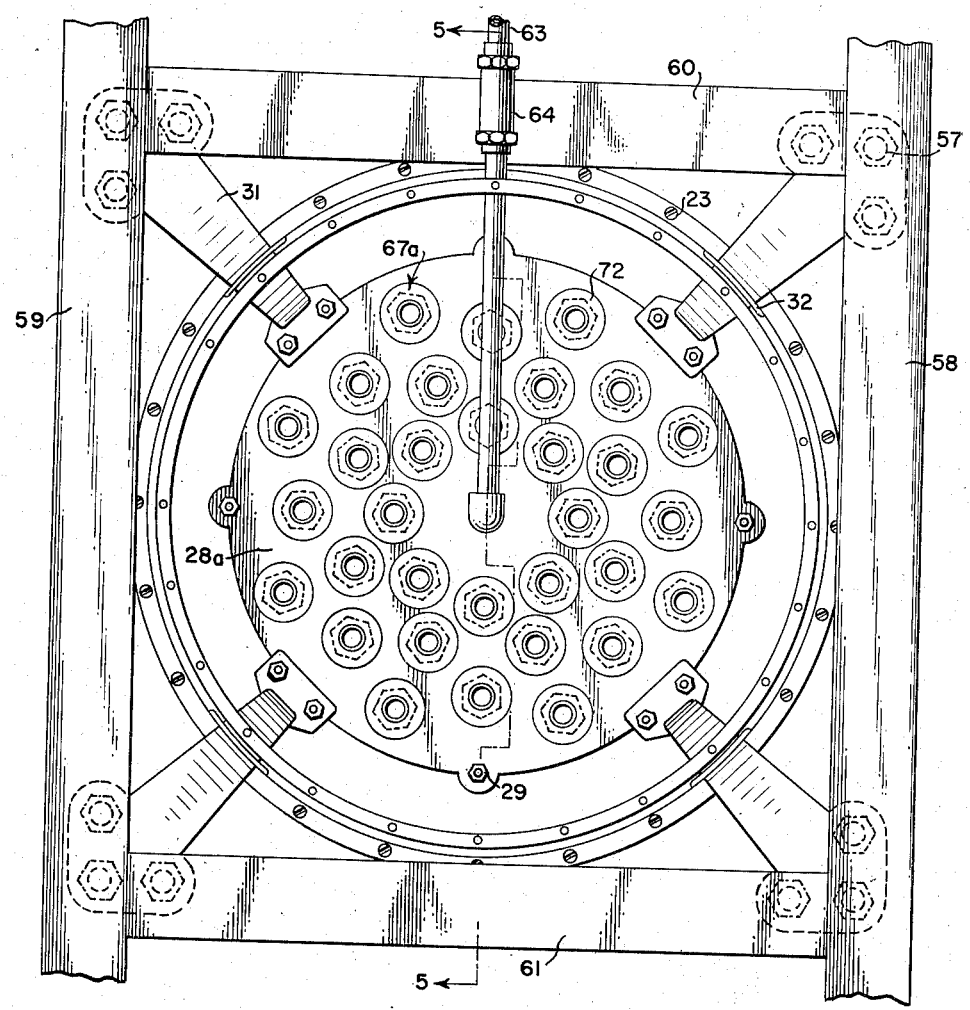
Fig. 4 is a front elevational view of a resonant jet engine constructed in accordance with the present invention.
Figure 5:
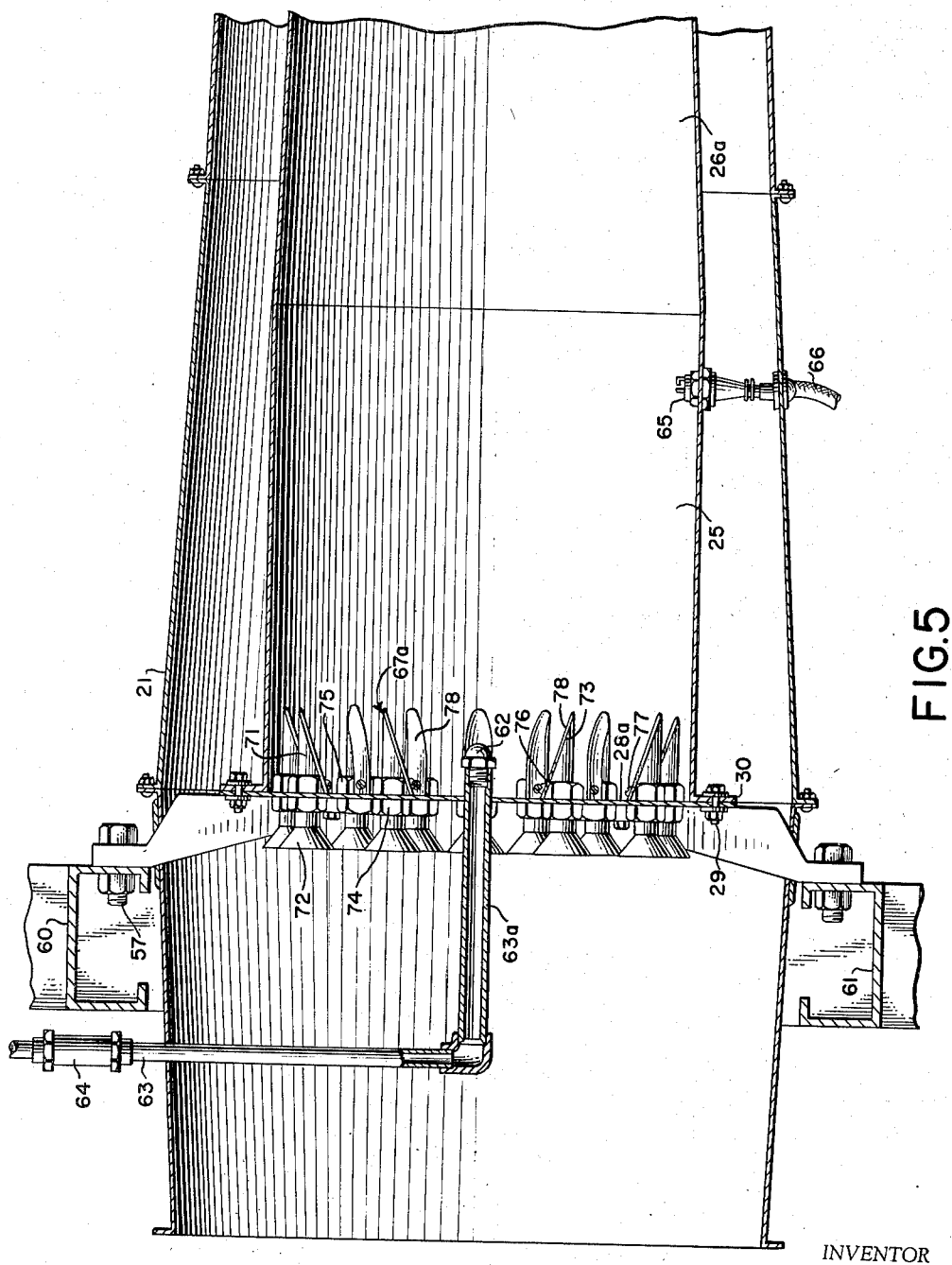
Fig. 5 is a longitudinal, sectional view taken along the line 5—5 of Fig. 4.

Referring now to Figs. 4 and 5, an embodiment of the present invention is there shown to include an outer tube 21 forming a co-axial jacket for a combustion chamber 25 and a jet tube 26a extending from the combustion chamber and tapering rearwardly. The outer tube or jacket 21 may be formed of several flanged sections, as shown, bolted together, as at 23 and 24, and serves to form an annular duct for the passage of cooling air around the combustion chamber 25 and jet tube 26a.

The combustion chamber 25 is closed at its forward end (to the left in Fig. 5) by a back plate 28a which is secured, as by bolts 29, to a flange 30 on the chamber 25. The back plate 28a, and the forward end of the combustion chamber, are supported on four engine mounts 31 which pass through suitable apertures in the outer tube 21 and are secured at their inner ends to the plate 28a, as by the bolts 29a. The apertures in the outer tube 21, accommodating the engine mounts 31, are preferably sealed by suitable gaskets 32. The engine mounts 31 are fixed at the outer ends thereof, by means of bolts 57, to a supporting framework comprising vertical spars 58 and 59, and horizontal truss members 60 and 61 which may be of channeled cross-section, as shown in Fig. 5.

A fuel inlet tube 63 extends radially into the outer tube 21 ahead of the back plate 28a and has a check, or one-way, valve 64 interposed therein. At its inner end, the tube 63 is joined to an axial tube 63a which extends centrally through the back plate 28a and into the combustion chamber 25. A nut 63b is preferably threaded on the tube 63a for adjusting the axial projection of the rear end of the latter into the combustion chamber. A fuel injection nozzle, for example, Monarch FPL 60°, is mounted on the rear end of the tube 63a, and the fuel inlet tube 63 is connected to a suitable fuel supply of adjustable pressure (not shown).

A spark plug 65, energized from a convenient voltage source (see Fig. 6) by a suitable connecting cable 66, projects into the combustion chamber 25.

A cluster of suitably located air inlets, generally indicated by the reference numeral 67a, is carried by the back plate 28a. Each air inlet comprises a pipe 71 passing through the plate 28a and having a flared forward end 72. The rear end of each pipe 71, extending into the combustion chamber, is beveled, as shown at 73. Forward and rear nuts 74 and 75, respectively, threaded on each pipe 71 to engage the opposite side of the back plate 28a, serve to secure each pipe in axially adjusted position relative to the back plate. Each rear nut 75 has a beveled face 76 to which there is preferably secured, by means of a set screw 77, a membrane or vibrating fin 78 in position to overlie the beveled rear end opening of the related pipe 71.

In operation, the fuel is admitted to the combustion chamber 25 through the injection nozzle 62. Whenever gas escapes from an orifice the flow thereof is modulated so that a rhythmical ebbing and flowing of the fuel stream will result. Since the frequency of the modulation of the fuel flow from the nozzle 62 is a function of the pressure differential existing across the latter, it is apparent that the frequency of the interrupted or phased admission of the fuel into the combustion chamber may be controlled by suitable adjustments of the fuel pressure flowing in supply tube 63. Thus, the modulated flow of fuel through the nozzle 62 is adjusted until the frequency thereof is harmonically related to both the fundamental frequency of the jet tube 26a and the natural frequency of the particular fuel. The phased admission of the fuel will result initially in a series of explosions which manifest themselves at the closed forward end of the engine as a pressure wave, the frequency of this wave being determined by the frequency of the fuel modulation. This pressure wave will result in forced vibrations of the membranes or fins 78 so that the air flow into the combustion chamber is synchronized with the modulated fuel flow. Thus, the modulated fuel flow generates an acoustic wave in the jet tube, and the air flow through each of the air inlets 67a also generates an acoustic wave of the same frequency so that these waves reinforce each other as related in connection with Fig. 2.

The axial adjustments provided in the mountings of the fuel inlet tube 63a and the air inlet pipes 71 permit the positioning of the latter so that the respective generated waves may be made to phase with the fundamenal frequency of the jet tube. In order to reach a response shock wave having amplitudes exceeding 140 decibels, the pressure behind fuel inflow is increased, thus increasing the amplitude and frequency of the fuel modulations, until the necessary shocks are present to excite the slower moving fuel molecules sufficiently for the liberation of molecular energy.

The employment of multiple fuel or air inlets, as in the illustrated device, having phased frequencies, makes the amplitudes additive so that the necessary standing shock wave may be produced. Further, when a flame contacts an adjacent wall, the active area of the flame front is increased thus amplifying the wave given off by the excited and ionized fuel molecules at the flame front. A similar effect is noted when flames, issuing from multiple inlets, meet, and the areas of contact of these flames become analagous to walls to increase the areas of the flame fronts and the amplitude of the acoustic waves given off by the excited fuel molecules and having the natural frequency of the latter.

In the embodiment shown in Figs. 6 to 14, inclusive, fuel from a tank 79 passes through a check valve 64 and feed line 63 into a fuel nozzle 82. The fuel nozzle 82 extends axially in an air cowl 81 and connects to a static fuel discharge head 84 which discharges the fuel into an intermediate air-fuel inlet section 85 from whence the air-fuel mixture flows through a mixer head 86 where it is further mixed with air entering through the apertures 87 of an air inlet head 88.

Figure 8:
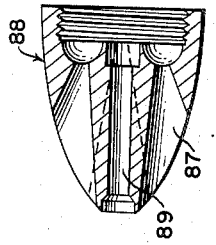
Fig. 8 is a vertical sectional view taken along the line 8—8 of Fig. 7.
Figure 7:
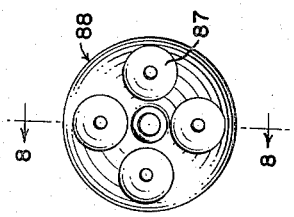
Fig. 7 is a front end view of an air inlet head forming part of the assembly of Fig 6.
Figure 14:
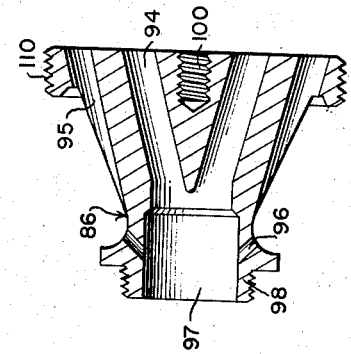
Fig. 14 is a vertical sectional view taken along the line 14—14 of Fig. 13.
Figure 13:
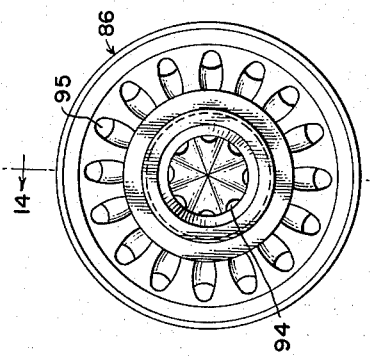
Fig. 13 is a front elevational view of a mixer head forming a part of the assembly of Fig. 6.
Figure 12:
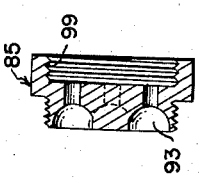
Fig. 12 is a vertical sectional view taken along the line 12—12 of Fig. 11.
Figure 11:
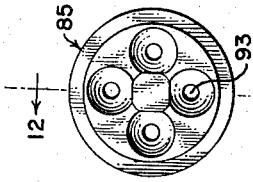
Fig. 11 is a front elevational view of an intermediate air-fuel inlet section forming part of the assembly of Fig. 6.
Figure 15:
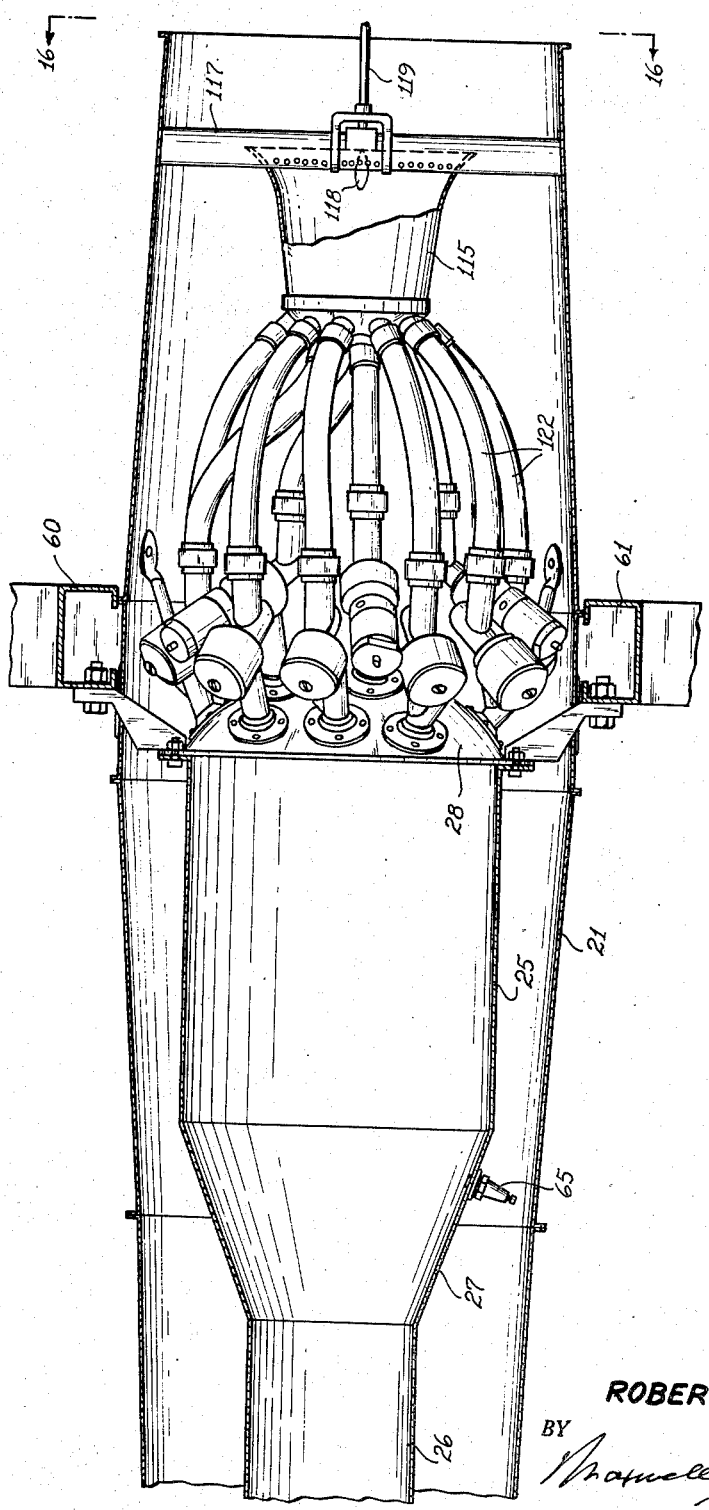
Fig. 15 is a side elevational view, partly broken away and in section, of a resonant jet engine constructed in accordance with still another embodiment of the present invention.
Figure 19:
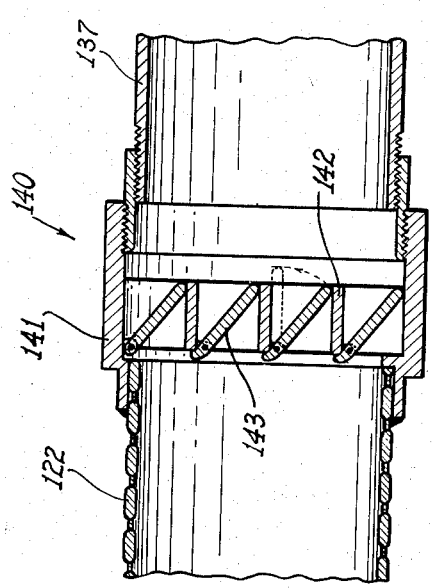
Fig. 19 is a longitudinal sectional view of a one-way valve included in the injector assembly of Fig. 17.
Figure 16:
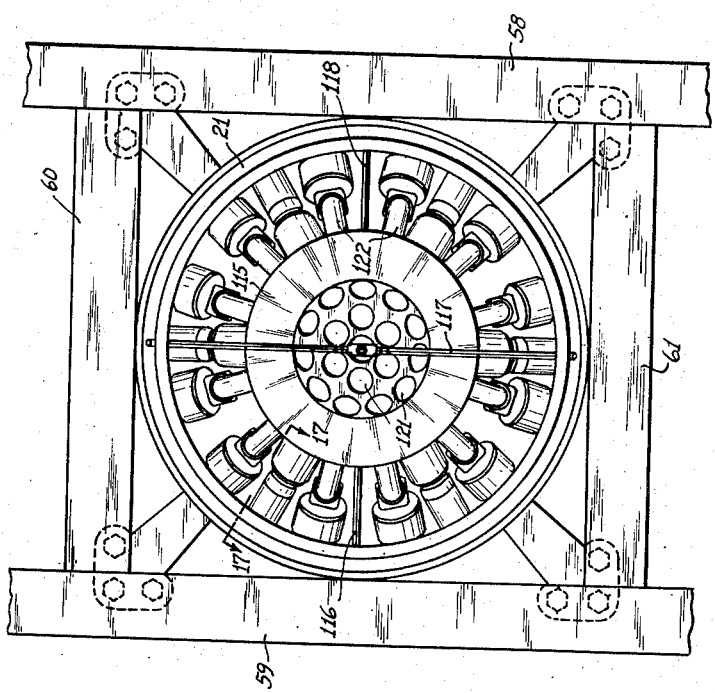
Fig. 16 is a front elevational view of the resonant jet engine of Fig. 15.

The air inlet head 88, shown in detail in Figs. 7 and 8, consists of a forwardly tapering and streamlined body fitting into the air cowl and having the four circumferentially spaced, generally axial, apertures 87 which receive air entering the cowl 81 through the open front end 80 of the latter. The head 88 is further formed with a central, axial bore 89 to receive the nozzle 82 which extends therethrough and into a central bore 90 (Figs. 9 and 10) of the static fuel discharge head 84. Head 84 has four radial arms 91, each formed with a radial passageway 92 communicating at the inner end with the bore 90 and opening outwardly into a chamber provided by the adjacent ends of the related aperture 87 of the head 88 and the corresponding axial passage 93 of the intermediate section 85 (Figs. 11 and 12).

The mixer head 86 (Figs. 13 and 14) is formed with a first set of conically arrayed passages 94 concentrically surrounded by a second set of similar passages 95, the passages 94 and 95 communicating with each other through small bores 96. The passages 94 all open into a central cavity 97 provided in a threaded flange 98 at the forward end of the head 86 for engagement in the threads 99 of the intermediate section 85. The outer passages 95 open at the forward ends thereof directly into the cowl 81 to receive air directly from the inlet opening 80 of the latter.

A tapped rearwardly opening bore 100 formed centrally in the mixer head 86 receives a bolt 101 which secures two vibrating plates 102 and 103 and a spacing washer 104 to the rear face of the head 86. Plate 102 is formed with a set of radial tongues 105 which register with the passages 95, and has a set of holes 106 registering with the passages 94 and with a similar set of holes 107 formed in the washer 104. The plate 103 is formed with radial tongues 108 registering with the holes 107 in the spacing washer. A retaining ring 109 engages the threads 110 on the outer periphery of the mixer head 86 and holds the latter on the forward end of the combustion chamber 25 of the jet tube 21a.

Figure 6:
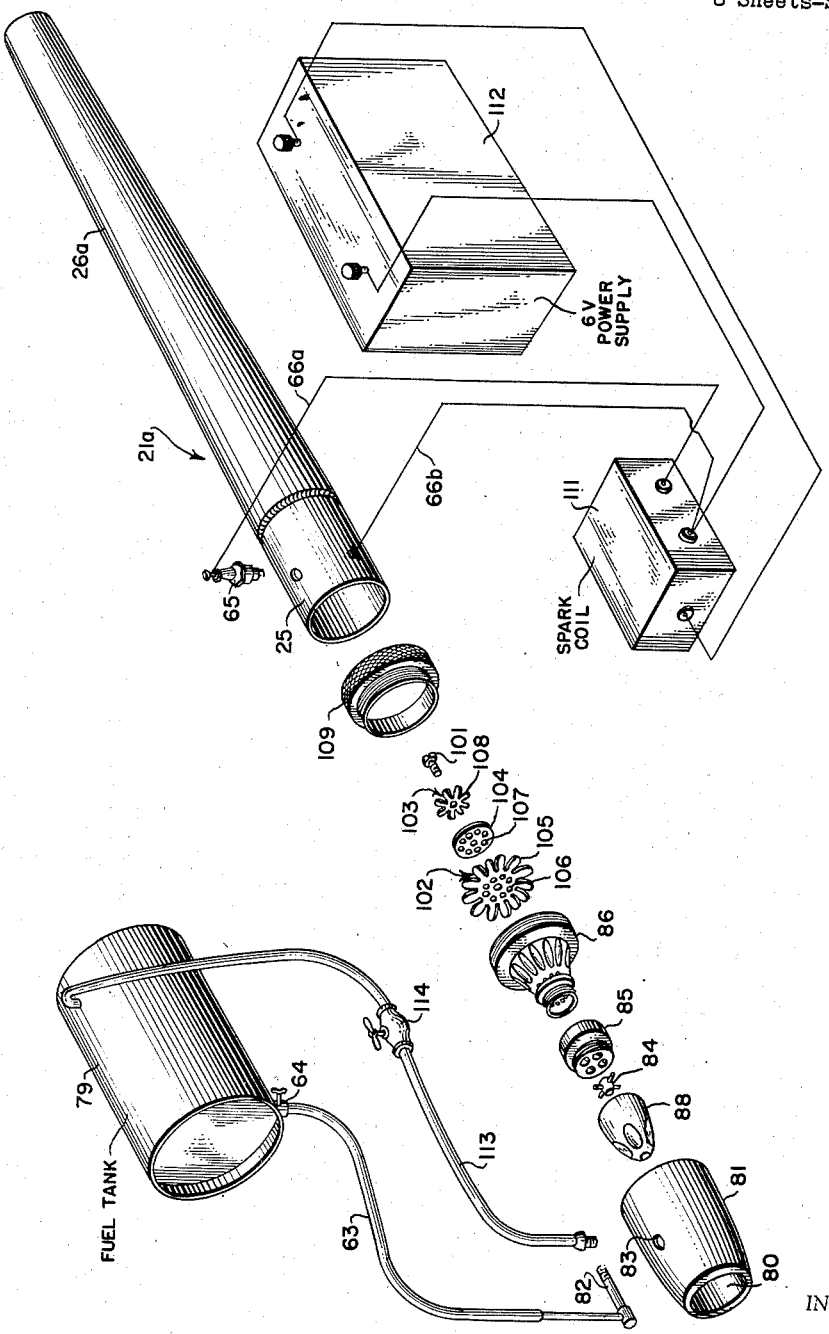
Fig. 6 is an exploded perspective view of a resonant jet engine constructed according to another embodiment of the present invention.
Figure 10:
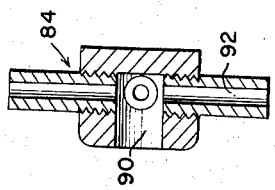
Fig. 10 is a vertical sectional view taken along the line 10—10 of Fig. 9.
Figure 9:
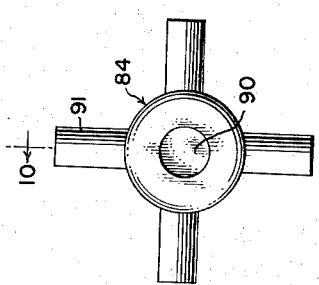
Fig. 9 is a front elevational view of a fuel discharge head forming part of the assembly of Fig. 6.

As further shown in Fig. 6, spark plug 65, extending into the combustion chamber, is connected to a spark coil 111, of conventional design, by way of two conductors 66a and 66b, with the coil 111 being energized from a suitable electric power source 112. A back pressure bleeder 113 leads from the air cowl 81, by way of aperture 83, to the fuel tank 79 and contains a shutoff valve 114.

The operation of the embodiment illustrated in Figs. 6 to 14 is similar to that described in connection with the device of Figs. 4 and 5 in that vibrating tongues or fins control the frequency of the admission of air to the combustion chamber. However, in the arrangement of Fig. 6, the admission of fuel is also regulated by vibrating tongues or fins. Since the rate or frequency of vibration of the fins 105 and 108 increases as the force of the explosions occurring in the chamber 25 increases, the frequency of admission of the fuel and air may be controlled by varying the fuel content of the mixture. Thus, the fuel content of the mixture is controlled until the frequencies of admission of the fuel and air through the multiple passages are harmonically related to the natural frequency of the fuel and to the fundamental frequency of the jet tube to produce the shock waves of the necessary amplitude.

Referring now to the embodiment shown in Figs. 15 to 19, inclusive, the resonant jet engine there illustrated includes an outer tube or jacket 21 having a concentric combustion chamber 25 therein communicating with a rearwardly extending jet tube 26 through an intermediate step-down section 27. The forward end of the combustion chamber 25 is closed by a rearwardly concaved back plate 28 and is supported by engine mounts 31 extending through the jacket to be carried by the framework 58, 59, 60 and 61, as in the first described embodiment.

A forwardly opening, bell-shaped member 115 is supported concentrically in the jacket 21 ahead of the combustion chamber 25. The support for the member 115 is preferably provided by horizontal arms 116 and 118 of streamlined cross-section and by a vertical streamlined spar 117. A fuel supply line 119 extends into the spar 117 and the latter is formed with discharge openings 120 at the central portion of the trailing edge thereof to discharge fuel into the member 115.

The rear end of the member 115 is formed with a plurality of spaced openings 121 (Fig. 16) from which flexible pipes 122 extend. Thus, the pipes 122 receive the mixture of fuel and air from the bell-shaped member 115. Each pipe 122 carries the fuel and air mixture to an injector assembly, generally indicated by the numeral 123, which is constructed and arranged to discharge a phased fuel-air mixture into the combustion chamber 25 through a related opening in the back plate of the latter.

Each injector assembly 123 includes an impeller housing 124 (Fig. 17) having an impeller 125 rotatable therein on a shaft 126. The chamber 127 of the housing containing the impeller is formed with spaced radial openings 128 and 129 which are separated by a partition 130 (Fig. 18). A hollow, pipe-like extension 131 extends radially from the housing 124 and communicates with the opening 128, and is formed with a lateral enlargement or flaring portion 132 which communicates with the opening 129. The outer end of the pipe-like extension 131 is threaded, as at 133, to engage in an internally threaded collar 134 having an outer surface defined by a section of a sphere. Suitable clamping rings 135 and 136 are secured to the opposite sides of the back plate 28 of the combustion chamber and form a socket to receive the collar 134. Rotation of the collar 134 on the pipe-like extension 131 will adjust the distance that the open outer end of the latter extends into the combustion chamber 25.

A fuel-air inlet pipe section 137 (Fig. 17) extends from the housing 124 and opens into the impeller containing chamber 127 in a generally axial direction through a port 138 which is remote from the openings 128 and 129. Certain of the injector assemblies 123 include a driving motor 139 mounted on the housing 124 and coupled to the shaft 126 for rotating the impeller 125 during starting of the engine and until operating conditions are achieved. Each driving motor 139 is of the type which also constitutes a generator when driven by the associated shaft 126.

Each flexible pipe 122 is connected to the inlet pipe section 137 of the related injector assembly through a back-fire valve (Figs. 17 and 19) which is generally indicated by the reference numeral 140. The back-fire valve 140 includes a housing 141 of generally square transverse cross-section open at its opposite ends to communicate with the related pipe 122 and inlet section 137. A series of cross-members 142 extend across the valve housing 141, and flap-valve members 143 are mounted pivotally in the housing 141 to swing in the direction toward the section 137 to positions (dotted lines in Fig. 19) flat against the adjacent cross-members 142 to open the spaces between the latter. When there is an excess of pressure in the section 137, the flap-valve members 143 swing down (as viewed in Fig. 19) to close the spaces between the cross-members 142.

In operation, the engine of Figs. 15 to 19 is brought up to operating conditions by the motors 139 included in certain of the injector assemblies. The impellers 125, when driven by the associated motors, draw fuel and air mixture into the chamber 127 and discharge this mixture tangentially into the enlargement 132 and, thence through the pipe-like extension 131, into the combustion chamber 25. The pipe-like extension 131 acts as an injector orifice, and the flow of the air-fuel mixture therethrough is modulated in the manner described in connection with the embodiment of Figs. 4 and 5. The spark plug 65 extending into the combustion chamber ignites the mixture during starting until the temperature of the combustion chamber rises sufficiently for auto-combustion. The speed of the motors 139 and the driven impellers is increased until the frequency of the modulated fuel-air mixture flow from the pipe-like sections 131 is harmonically related to the natural frequency of the fuel molecules and the fundamental frequency of the jet tube, and is sufficiently high to produce the desired shock waves of amplitudes of 140 decibels or greater.

The adjustable mounting of the various pipe-like sections 131 in the back-plate 28 permits the adjustment of the outlet ends of the sections 131 so that the various generated waves will be in phase to cooperate in building-up the necessary shock amplitude.

When the injectors are operating at the critical frequency, the motors 139 may be shut off, and the injectors then operate automatically in the following manner. Each explosion in the combustion chamber gives rise to a detonation wave moving toward the backplate 28. This detonation wave enters the pipe-like section 131 and moves therealong. Since the high frequency detonation wave tends to move in a straight path, it will act on the blades of the impeller 125 through the opening 128 and will not be diverted laterally into the enlargement 132. Thus, each successive explosion in the combustion chamber will spin the impeller 125 in the direction indicated by the arrow of Fig. 18, and, in between successive explosions, the impeller will propel the air-fuel mixture through the opening 129 into the lateral enlargement 132 and along the pipe-like extension 131. It can be seen that those injector assemblies not having a driving motor, will be brought up to the necessary speed by the increasing frequency of the explosions caused by the acceleration of the motor driven impellers. When the engine is functioning at operating conditions, the motor-generators 139 may then be utilized to deliver electrical power as the impellers are spun by the successive explosions to rotate the associated shafts 126.

From the above detailed description of the illustrated embodiments of the present invention, it can be seen that each embodiment includes clusters of inlets for at least one component of the air-fuel mixture so that the necessary shock wave of great amplitude may be readily obtained by the additive effects of the waves generated at such inlets.

Further, since each nodal point of the resultant standing shock wave is a point of greatly varying pressure, it will be understood that the combustible gases are repeatedly subjected to very rigorous excitation and ionization as they pass from the entropy end of the tube to the exit of the latter. Accordingly, any molecule of the mixture that may have escaped dissociation at the initial nodal points will probably undergo critical excitation and ionization at one of the successive nodal points, so that the probability of any quantity of fuel escaping from the jet tube without liberating its latent molecular energy is materially reduced.

Since the critical excitation of the fuel molecules to liberate molecular energy is primarily accomplished by the action of standing shock waves, or by a process called shock fission, it is possible to operate the jet engine at temperatures lower than those heretofore believed to be practical. Since the pressure peaks of the standing shock waves are not critically affected by the ambient or atmospheric pressure, it will also be possible to operate resonant jet engines embodying the present invention at the very low atmospheric pressures associated with high altitude.

Although the invention has been described with particular reference to a resonant jet tube for propulsion purposes, it is to be understood that a power plant embodying the features of the present invention may be utilized for other purposes, for example, in a furnace, and that the invention is not limited to the precise embodiments herein illustrated but is susceptible to a great number of modifications and changes without departing from or exceeding its scope as defined in the appended claims.

I claim:

1. In a power plant of the described character; in combination, an elongated tube closed at one end, and means supplying a combustible fuel mixture to said closed end of the tube, said tube being dimensioned so that the natural frequency of the fuel molecules of said mixture is an odd harmonic of the fundamental frequency of said tube at operating conditions, said supplying means including means rhythmically modulating the flow of at least one component of said mixture into said tube at a frequency which is an odd harmonic of said fundamental frequency of the tube at operating conditions.

2. In a power plant of the described character; the combination as set forth in claim 1, wherein said supplying means introduces at least said one component of said mixture into the elongated tube at a plurality of laterally spaced locations so that the rhythmic modulation of said one component generates a plurality of acoustic waves each in phase with the other.

3. In a resonant jet engine of the described character; the combination of a combustion tube closed at the front end thereof, a super-acoustic fuel injector nozzle extending into said tube at said closed front end, means for supplying fuel to said nozzle at a variable pressure to provide a rhythmically modulated fuel flow through the nozzle at a frequency which is harmonically related to both the fundamental frequency of said tube at operating conditions and the natural frequency of the fuel molecules, and a plurality of air admitting means at said front end of the combustion tube operative to interruptedly admit air to the latter in phase with the modulated fuel flow.

4. In a resonant jet engine of the described character; the combination of a combustion tube closed at the front end thereof; and means for supplying a combustible mixture to said tube at the front end of the latter, said means including a plurality of air admitting valves mounted on said closed front end of the tube, each of said valves having a port and a vibratory member overlying said port at the end of the latter opening into said combustion chamber, at least one super-acoustic fuel injector nozzle extending into said tube at said closed front end thereof, and means for supplying fuel to said nozzle at a variable high pressure to provide a rhythmically modulated fuel flow through said nozzle at a frequency which is harmonically related to both the fundamental frequency of said tube at operating conditions and the natural frequency of the fuel molecules.

5. In a resonant jet engine of the described character; the combination as set forth in claim 4; wherein said closed front end of the combustion tube is formed by a back plate, said air admitting valves include pipe members extending through said back plate and axially adjustable relative to the latter, and wherein said fuel injector nozzle is axially adjustable relative to said back plate so that the acoustic waves generated at the outlet ends of said pipes and said nozzle may be phased to reinforce each other.

6. In a resonant jet engine of the described character; the combination of a combustion tube closed at the front end thereof, a plurality of vibratory air admitting means at said front end of the combustion tube operative to interruptedly admit air to the latter in phase with the generation of variable pressures in said tube, a super-acoustic fuel injector nozzle extending into said tube at said closed front end, and means for supplying fuel to said nozzle at a variable pressure to provide a rhythmically modulated fuel flow through the nozzle at a frequency which is harmonically related to both the fundamental frequency of said tube at operating conditions and the natural frequency of the fuel molecules to produce a standing shock wave in said tube having amplitudes of 140 decibels and greater.

7. A resonant jet engine comprising an outer tube open at its opposite ends, an inner combustion tube spaced from and coaxially disposed within said outer tube to provide an air duct therebetween, said combustion tube opening rearwardly and having a back plate at the front end thereof, fuel and air admitting means adjacent said back plate rhythmically controlling the admission of fuel and air into said combustion tube in periods harmonically related to both the fundamental frequency of said combustion tube at operating conditions and the natural frequency of the fuel molecules, and variable fuel supplying means adapted to control the proportion of fuel to air so that standing shock waves are produced in said combustion tubes having amplitudes of at least 140 decibels.

8. A resonant jet engine as set forth in claim 7, wherein said fuel and air admitting means includes an air cowl at the forward end of said outer tube, mixer means in said cowl arranged to mix fuel from said supplying means with air from said cowl, a first series of channeled means opening into said combustion tube through said back plate of the latter and arranged to receive the mixed fuel and air from said mixer means, a second series of channeled means also opening into said combustion tube through said back plate and arranged to receive air from said cowl, a first set of vibratory members registering with the ends of said first series of channeled means opening into said combustion tube, and a second set of vibratory members registering with the ends of said second series of channeled means opening into said combustion tube.

9. A resonant jet engine comprising a combustion tube, a back plate closing the front end of said tube, a plurality of pipes extending through said back plate and opening into said combustion tube, means for axially adjusting each of said pipes relative to said back plate, and means supplying a combustible mixture to said pipes including pumping means for each pipe operative to pressurize the combustible mixture so that the flow through said pipes is rhythmically modulated at a frequency harmonically related to both the fundamental frequency of said combustion tube and the natural frequency of the fuel molecules of said combustible mixture for producing standing shock waves in said tube of amplitudes exceeding 140 decibels.

10. A resonant jet engine as set forth in claim 9, wherein said supplying means further includes a forwardly opening mixing member adapted to receive air, means injecting fuel into said mixing member for mixture with the air received by the latter, conduit means extending from the back of said mixing member to each of said pumping means for conveying the fuel-air mixture to the latter, and motor driven means for certain of said pumping means operative to actuate the latter for establishing said rhythmically modulated flow through the related pipes.

11. A resonant jet engine as set forth in claim 10, wherein said pumping means includes an impeller housing, a rotatable radial impeller in said housing, said housing being formed with an axially opening port for receiving the fuel-air mixture from the related conduit means, a first radial port in said housing opening into the related pipe for receiving the detonation pressure wave from said combustion tube, a lateral enlargement formed at the end of said pipe communicating with said housing, and a second radial port in said housing opening into said lateral enlargement for delivering the pumped air-fuel mixture to the latter so that said impellers are driven in response to explosions occurring in said combustion tube.

12. A resonant jet engine as set forth in claim 11, further including a check valve in each of said conduits operative to permit flow therethrough only in the direction toward the related pumping means thereby preventing back firing in said mixing member.

13. A resonant jet engine as set forth in claim 12, wherein said motor driven means are operative to generate electrical power when said impellers are driven in response to said explosions occurring in said combustion tube.

References Cited in the file of this patent

UNITED STATES PATENTS

| 2,480,540 | Bodine | Aug. 30, 1949 |
| 2,505,757 | Dunbar et al. | May 2, 1950 |
| 2,508,396 | Jordan | May 23, 1950 |
| 2,523,308 | Kemmer et al. | Sept. 26, 1950 |
| 2,525,782 | Dunbar | Oct. 17, 1950 |
| 2,538,179 | Weinhardt | Jan. 16, 1951 |
| 2,581,902 | Bodine | Jan. 8, 1952 |